US011988831B2

(12) United States Patent
Chen et al.

(10) Patent No.: US 11,988,831 B2
(45) Date of Patent: *May 21, 2024

(54) METHOD OF DISPLAYING REAR-VIEW IMAGE AND MOBILE DEVICE USING THE SAME

(71) Applicant: Kinpo Electronics, Inc., New Taipei (TW)

(72) Inventors: Yu Chi Chen, New Taipei (TW); Hsien Chung Chen, New Taipei (TW); Sheng-Chang Wu, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,166

(22) Filed: Feb. 14, 2023

(65) Prior Publication Data
US 2023/0341681 A1 Oct. 26, 2023

(30) Foreign Application Priority Data
Apr. 21, 2022 (CN) .......................... 202210420894.4

(51) Int. Cl.
G09G 5/00 (2006.01)
B60K 35/60 (2024.01)
G02B 27/01 (2006.01)
G09G 5/36 (2006.01)
B60K 35/23 (2024.01)

(52) U.S. Cl.
CPC .......... G02B 27/0101 (2013.01); B60K 35/60 (2024.01); G09G 5/36 (2013.01); B60K 35/23 (2024.01); G09G 2320/0686 (2013.01)

(58) Field of Classification Search
CPC ............ G09G 5/36; G09G 2320/0686; G02B 27/0101; B60K 35/00; B60K 37/02; B60K 2370/1529
See application file for complete search history.

(56) References Cited

U.S. PATENT DOCUMENTS

| 5,670,935 | A | * | 9/1997 | Schofield | .......... | B60R 21/01538 |
| | | | | | | 348/E7.086 |
| 10,296,083 | B2 | * | 5/2019 | Sung | ..................... | G06F 3/1431 |
| 2007/0085708 | A1 | * | 4/2007 | Kato | .................... | G01C 21/265 |
| | | | | | | 340/995.1 |
| 2018/0334216 | A1 | | 11/2018 | Montez et al. | | |
| 2021/0274130 | A1 | * | 9/2021 | Nodder | ............ | G08B 13/19695 |
| 2022/0012504 | A1 | | 1/2022 | Liu et al. | | |
| 2022/0118915 | A1 | * | 4/2022 | Pastoor | ................... | B60R 11/04 |

(Continued)

FOREIGN PATENT DOCUMENTS

CN 110775063 2/2020
KR 101708313 B1 * 2/2017

(Continued)

Primary Examiner — Joe H Cheng
(74) Attorney, Agent, or Firm — JCIPRNET

(57) ABSTRACT

A method of displaying a rear-view image and a mobile device using the method are provided. The method includes: receiving the rear-view image; displaying a virtual dashboard through a display; and displaying the rear-view image on a default area of the virtual dashboard in response to receiving a signal associated with a direction indicator light, wherein the default area corresponds to the direction indicator light.

17 Claims, 5 Drawing Sheets

(56) References Cited

U.S. PATENT DOCUMENTS

2022/0212690 A1\* 7/2022 Zheng .................... B60K 35/00
2023/0339403 A1\* 10/2023 Chen ........................ B60R 1/00

FOREIGN PATENT DOCUMENTS

| KR | 101924059 B1 | \* | 3/2017 |
| KR | 20220042904 A | \* | 4/2022 |
| TW | M528917 | | 9/2016 |
| TW | M621202 | | 12/2021 |

\* cited by examiner

METHOD OF DISPLAYING REAR-VIEW IMAGE AND MOBILE DEVICE USING THE SAME

CROSS-REFERENCE TO RELATED APPLICATION

This application claims the priority benefit of China application serial no. 202210420894.4, filed on Apr. 21, 2022. The entirety of the above-mentioned patent application is hereby incorporated by reference herein and made a part of this specification.

BACKGROUND

Technical Field

The disclosure relates to a method of displaying a rear-view image and a mobile device using the method.

Description of Related Art

Currently, for most vehicles (such as motorcycles) in mainstream markets, traditional dashboards are replaced by digital dashboards. Compared with traditional dashboards, digital dashboards can provide more functions, such as displaying speed or time digitally. However, limited by the size of digital dashboards, existing digital dashboards still cannot provide functions such as displaying rear-view images for drivers.

SUMMARY

The disclosure provides a method of displaying a rear-view image and a mobile device using the method, and the rear-view image can be displayed through the mobile device for a user to view.

A mobile device of the disclosure includes a display, a transceiver, a storage medium, and a processor. The transceiver receives a rear-view image. The storage medium stores multiple modules. The processor is coupled to the storage medium, the transceiver, and the display, and accesses and executes the modules. The modules include a dashboard application program. The dashboard application program displays a virtual dashboard through the display. The dashboard application program displays the rear-view image on a default area of the virtual dashboard in response to receiving a signal associated with a direction indicator light through the transceiver. The default area corresponds to the direction indicator light.

In an embodiment of the disclosure, the virtual dashboard includes a first area corresponding to a first direction and a second area corresponding to a second direction. The dashboard application program sets the first area as the default area in response to the direction indicator light corresponding to the first direction.

In an embodiment of the disclosure, the dashboard application program receives dashboard information through the transceiver and displays the dashboard information on the second area.

In an embodiment of the disclosure, the dashboard application program fades an image displayed on the second area.

In an embodiment of the disclosure, the rear-view image includes a first rear-view image corresponding to the first direction and a second rear-view image corresponding to the second direction. The dashboard application program displays the first rear-view image on the default area in response to the direction indicator light corresponding to the first direction.

In an embodiment of the disclosure, the dashboard application program divides a display area of the virtual dashboard into the first area corresponding to the first direction and the second area corresponding to the second direction in response to receiving the signal.

In an embodiment of the disclosure, the transceiver receives the rear-view image through one of a Wi-Fi protocol, a Bluetooth protocol, and a universal serial bus protocol.

In an embodiment of the disclosure, the dashboard application program is associated with information of operation of a vehicle or driving of the vehicle.

A method of displaying a rear-view image of the disclosure is suitable for a mobile device, and the method includes the following. The rear-view image is received. A virtual dashboard is displayed through a display. The rear-view image is displayed on a default area of the virtual dashboard in response to receiving a signal associated with a direction indicator light. The default area corresponds to the direction indicator light.

In an embodiment of the disclosure, the virtual dashboard includes a first area corresponding to a first direction and a second area corresponding to a second direction. The method further includes the following. The first area is set as the default area in response to the direction indicator light corresponding to the first direction.

In an embodiment of the disclosure, the method further includes the following. Dashboard information is received, and the dashboard information is displayed on the second area.

In an embodiment of the disclosure, the method further includes the following. An image displayed on the second area is faded.

In an embodiment of the disclosure, the rear-view image includes a first rear-view image corresponding to the first direction and a second rear-view image corresponding to the second direction. The method further includes the following. The first rear-view image is displayed on the default area in response to the direction indicator light corresponding to the first direction.

In an embodiment of the disclosure, the method further includes the following. A display area of the virtual dashboard is divided into the first area corresponding to the first direction and the second area corresponding to the second direction in response to receiving the signal.

In an embodiment of the disclosure, the method further includes the following. The rear-view image is received through one of a Wi-Fi protocol, a Bluetooth protocol, and a universal serial bus protocol.

In an embodiment of the disclosure, the virtual dashboard is associated with information of operation of a vehicle or driving of the vehicle.

Based on the above, the mobile device of the disclosure can be used to replace a traditional digital dashboard of a motorcycle. The mobile device can display the rear-view image of the motorcycle according to the signal of the direction indicator light, so as to help a user to be timely informed of road conditions behind when turning or changing lanes.

DESCRIPTION OF THE EMBODIMENTS

Figure 1:
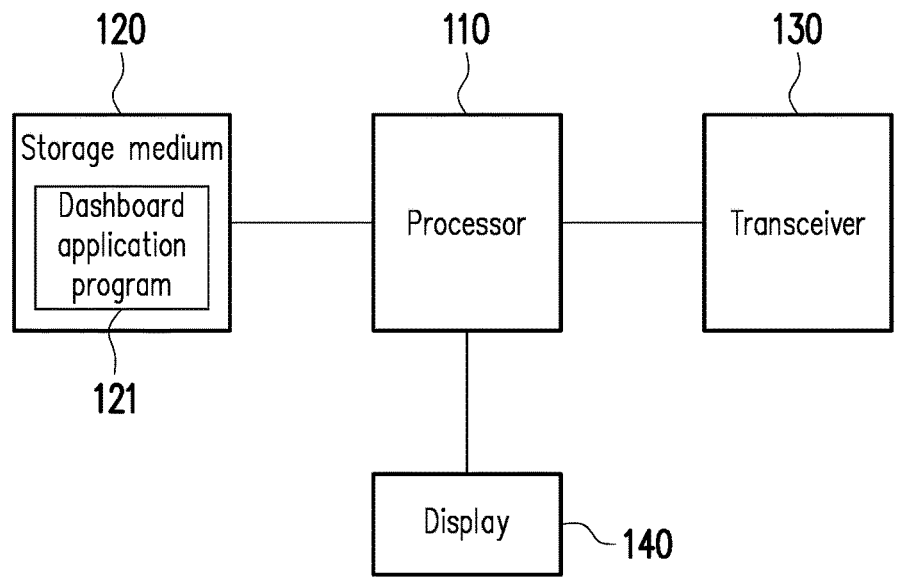
FIG. 1 is a schematic diagram illustrating a mobile device according to an embodiment of the disclosure.

In order to make the content of the disclosure more comprehensible, the following embodiments are especially given as examples according to which the disclosure can indeed be implemented. Additionally, where possible, elements/components/steps using the same reference numerals in the drawings and embodiments represent the same or similar parts.

FIG. 1 is a schematic diagram illustrating a mobile device 100 according to an embodiment of the disclosure, wherein the mobile device 100 has a function of displaying a virtual dashboard, which can be used to replace a digital dashboard of a motorcycle. The mobile device 100 may include a processor 110, a storage medium 120, a transceiver 130, and a display 140. The mobile device 100 includes, for example, a smartphone or a tablet mobile device (pad).

The processor 110 is, for example, a central processing unit (CPU), other programmable general-purpose or special-purpose micro control units (MCU), microprocessors, digital signal processors (DSP), programmable controllers, application specific integrated circuits (ASIC), graphics processing units (GPU), image signal processors (ISP), image processing units (IPU), arithmetic logic units (ALU), complex programmable logic devices (CPLD), field programmable gate arrays (FPGA), other similar elements, or a combination of the above elements. The processor 110 may be coupled to the storage medium 120, the transceiver 130, and the display 140, and access and execute multiple modules and various application programs stored in the storage medium 120.

The storage medium 120 is, for example, any type of fixed or removable random access memory (RAM), read-only memory (ROM), flash memory, hard disk drive (HDD), solid state drive (SSD), similar elements, or a combination of the above elements for storing the modules or the various application programs executable by the processor 110. In this embodiment, the storage medium 120 may store modules including a dashboard application program 121, and functions thereof will be described later.

The transceiver 130 transmits and receives signals in a wireless or wired manner. The transceiver 130 may also execute operations such as low noise amplification, impedance matching, frequency mixing, up or down frequency conversion, filtering, amplification, and similar operations. The dashboard application program 121 may receive signals from an electronic control unit (ECU) and/or a dashboard camera of the motorcycle in the wireless or wired manner through the transceiver 130, wherein the signal may include a signal associated with a direction indicator light or a rear-view image, or may include dashboard information commonly seen on the motorcycle. The electronic control unit may be coupled to a sensor of the motorcycle to obtain sensing data. For example, the sensor includes, for example, a liquid level sensor disposed in a fuel tank of the motorcycle. The electronic control unit may output a signal for displaying a fuel level according to the sensing data from the liquid level sensor. The signal of the dashboard camera is, for example, a signal captured by an image capture device (e.g., a CMOS image sensor (CIS) or a charge coupled device (CCD)) disposed on the body of the motorcycle. In an embodiment, the signal of the electronic control unit and the signal of the dashboard camera may be integrated together or the hardware itself may be a single device. The transceiver 130 may communicate with the electronic control unit and/or the dashboard camera through a communication protocol supported by the transceiver 130, such as a Wi-Fi protocol, a Bluetooth protocol, or a universal serial bus protocol. Before transmitting the signal to the transceiver 130, the electronic control unit and/or the dashboard camera may convert a signal of a controller area network (CAN) protocol into a signal of the communication protocol supported by the transceiver 130.

The signal of the rear-view image may include a rear-view image corresponding to a right direction and a rear-view image corresponding to a left direction, wherein the rear-view image of the right direction may be similar to an image captured by a right rear-view mirror of the motorcycle, and the rear-view image of the left direction may be similar to an image captured by a left rear-view mirror of the motorcycle.

The dashboard information may include, but is not limited to, information such as engine malfunction diagnostic light, neutral indicator light and/or gear display, oil change indicator light, high beam indicator light, speed, rotational speed, fuel level, time, overrun light, and mileage.

The display 140 may include a liquid crystal display panel or an organic light emitting diode display panel (OLED), and the display panel may further be a twisted nematic liquid crystal display (twisted nematic-LCD) panel or a thin film transistor liquid crystal display (thin film transistor-LCD) panel. The dashboard application program 121 may display the virtual dashboard through the display 140. The virtual dashboard may be used to display information such as the direction indicator light, the rear-view image, or the dashboard information.

Figure 2:
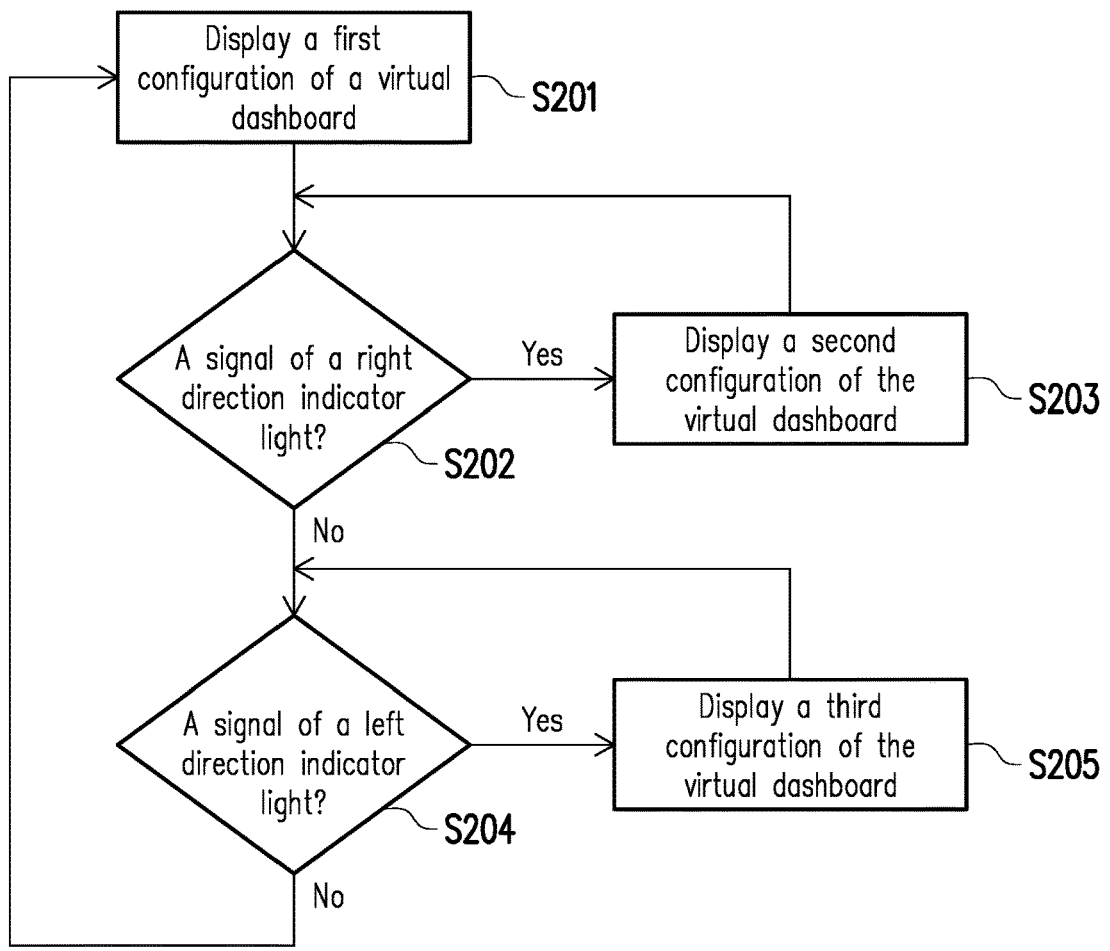
FIG. 2 is a flowchart illustrating displaying a rear-view image according to an embodiment of the disclosure.

FIG. 2 is a flowchart illustrating displaying a rear-view image according to an embodiment of the disclosure, wherein the process may be implemented by the mobile device 100 shown in FIG. 1. Assuming that the motorcycle is in a state of going straight at first, in Step S201, the dashboard application program 121 may display a first configuration of the virtual dashboard through the display 140, wherein the first configuration is a configuration displayed by the virtual dashboard in a case of going straight.

Figure 3A:
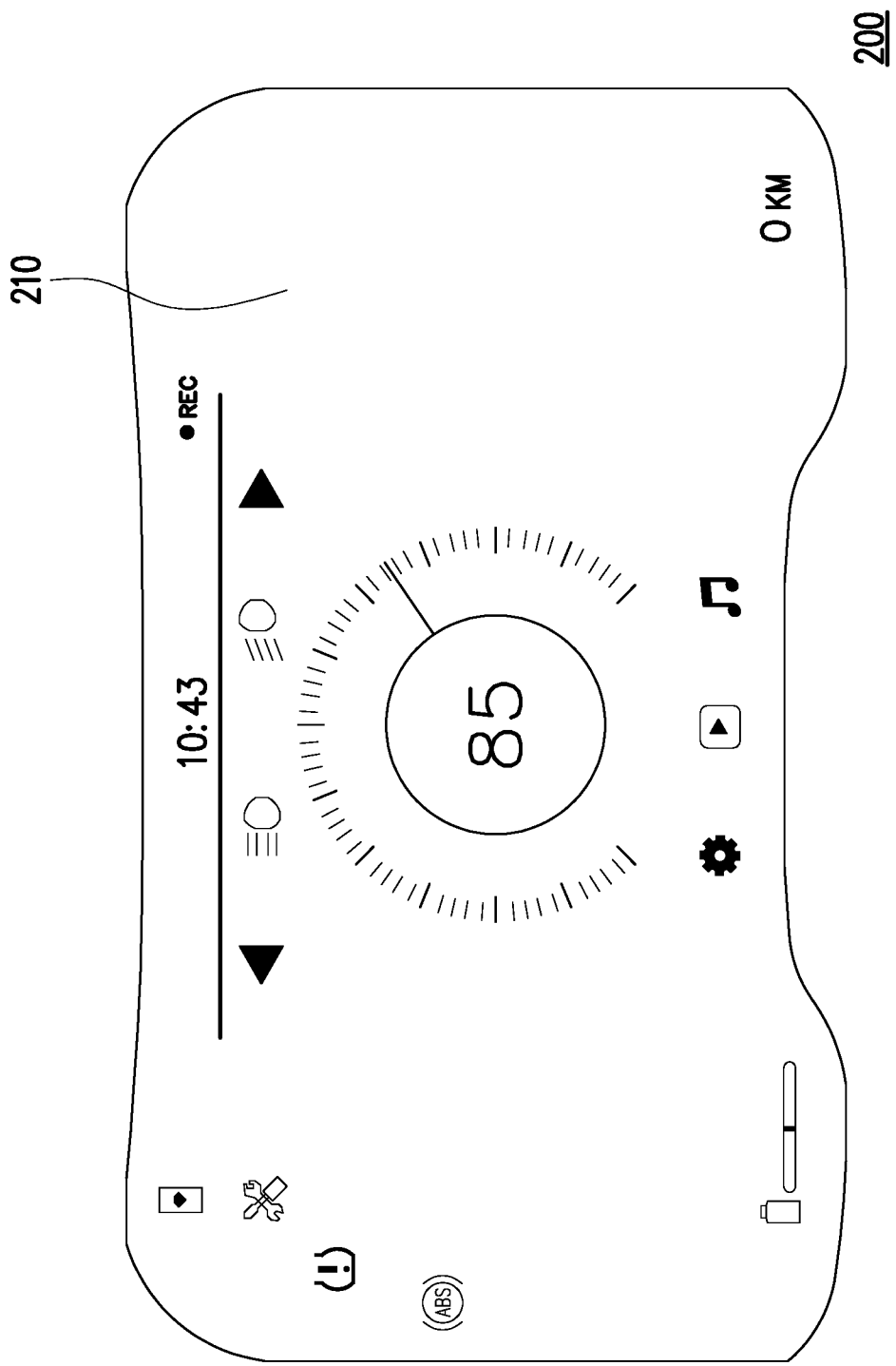
FIG. 3A is a schematic diagram illustrating a first configuration of a virtual dashboard according to an embodiment of the disclosure.

FIG. 3A is a schematic diagram illustrating a first configuration of a virtual dashboard 200 according to an embodiment of the disclosure. The first configuration of the virtual dashboard 200 may include a display area, an area 210. The dashboard application program 121 may display the dashboard information such as engine (or drive motor of an electric vehicle) malfunction diagnostic light, neutral indicator light and/or gear display, oil change indicator light, high beam indicator light, speed, rotational speed, fuel level (or battery level of the electric vehicle), time, overrun light, and mileage through the area 210. That is, the virtual dashboard 200 or the dashboard application program 121 is associated with information of operation of a vehicle or driving of the vehicle.

Returning to FIG. 2, in Step S202, the dashboard application program 121 may determine whether a signal associated with a right direction indicator light is received. For example, when a user is going to drive in the right direction (turn right), the user toggles or presses a button of driving in the right direction (turning right) on the motorcycle to activate a warning light. After a signal of the right direction indicator light is generated by the electronic control unit of the motorcycle, the electronic control unit may convert the signal from the CAN protocol into the communication protocol supported by the transceiver 130, thereby generating the signal associated with the right direction indicator light. If the dashboard application program 121 receives the signal associated with the right direction indicator light through the transceiver 130, Step S203 is proceeded. If the dashboard application program 121 does not receive the signal associated with the right direction indicator light through the transceiver 130, Step S204 is proceeded.

In Step S203, the dashboard application program 121 may display a second configuration of the virtual dashboard 200 through the display 140, wherein the second configuration may display a rear-view image corresponding to the right direction indicator light on a default area corresponding to the right direction indicator light. That is, in this step, because the user is going to drive in the right direction (turn right), the rear-view image of the right direction indicator light of concern is configured in the right half of the entire display area 210 in the original FIG. 3A (that is, the default area corresponding to the right direction indicator light), so that when the user possibly turns the head slightly to the right to observe traffic conditions on the right side because of going to drive in the right direction, the configuration is in line with the action thereof and in line with the direction of vision or of deflecting the head.

Figure 3B:
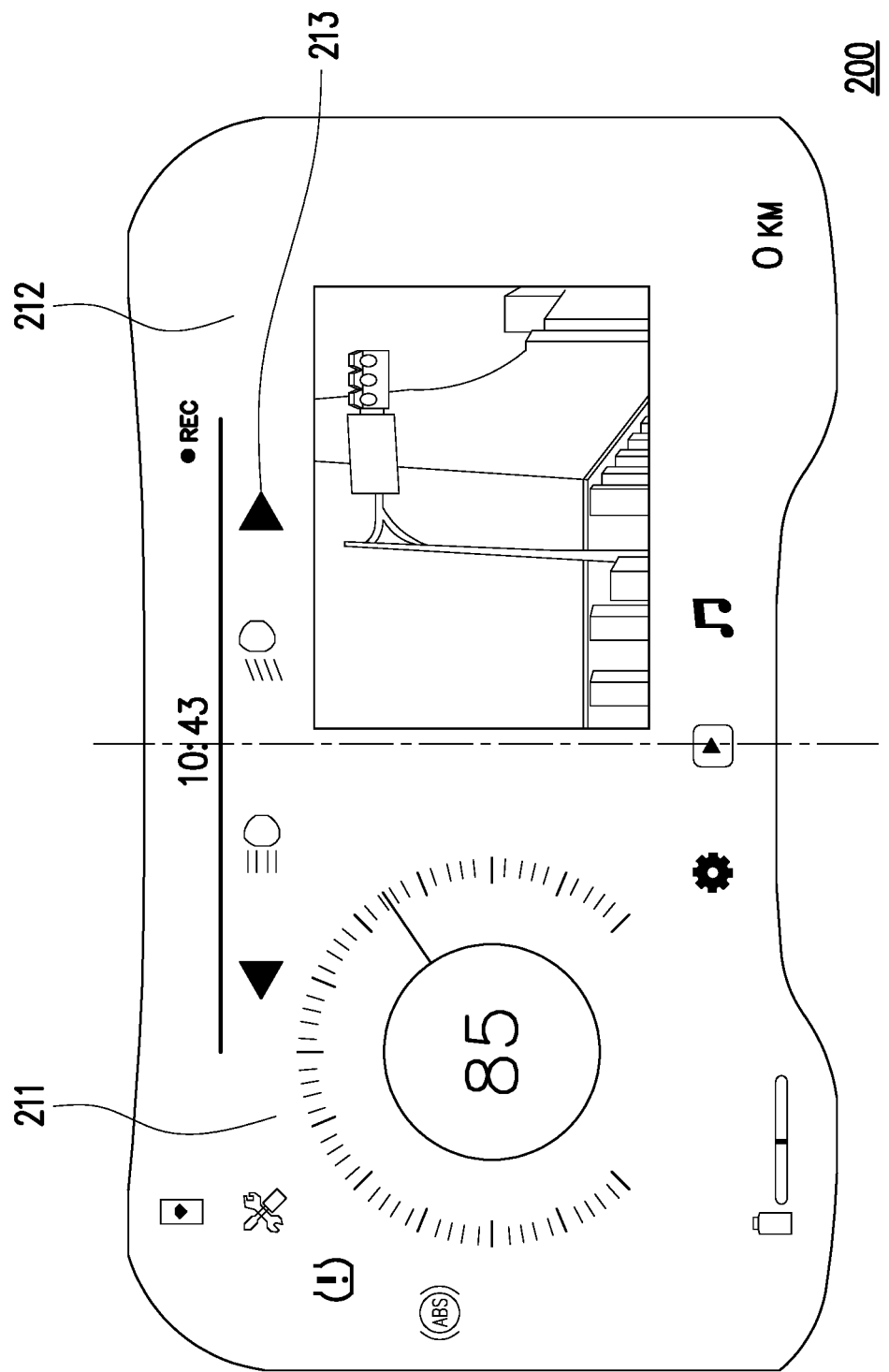
FIG. 3B is a schematic diagram illustrating a second configuration of a virtual dashboard according to an embodiment of the disclosure.

FIG. 3B is a schematic diagram illustrating a second configuration of the virtual dashboard 200 according to an embodiment of the disclosure. Specifically, after the dashboard application program 121 receives a signal associated with a right direction indicator light 213, the dashboard application program 121 may divide the display area of the virtual dashboard 200 from the area 210 into an area 211 (which may be positioned on a left side of the virtual dashboard 200) corresponding to the left direction and an area 212 (which may be positioned on a right side of the virtual dashboard 200) corresponding to the right direction. The dashboard application program 121 may set the area 212 corresponding to the right direction as the default area in response to the received signal corresponding to the right direction, so as to display the rear-view image of the right direction through the default area. On the other hand, the dashboard application program 121 may display the dashboard information on the area 211 corresponding to the left direction. In other words, the image originally displayed on the larger area 210 may be reduced and displayed on the smaller area 211. In an embodiment, the dashboard application program 121 may fade an image displayed on the area 211, so that the rear-view image displayed on the area 212 is more prominent to help the user to focus on viewing the rear-view image.

Returning to FIG. 2, in Step S204, the dashboard application program 121 may determine whether a signal associated with a left direction indicator light is received. For example, when the user is going to drive in the left direction (turn left), the user toggles or presses a button of driving in the left direction (turning left) on the motorcycle to activate a warning light. After the signal of left direction indicator light is generated by the electronic control unit of the motorcycle, the electronic control unit may convert the signal from the CAN protocol into the communication protocol supported by the transceiver 130, thereby generating the signal associated with the left direction indicator light. If the dashboard application program 121 receives the signal associated with the left direction indicator light through the transceiver 130, Step S205 is proceeded. If the dashboard application program 121 does not receive the signal associated with the left direction indicator light through the transceiver 130, Step S201 is executed again.

In Step S205, the dashboard application program 121 may display a third configuration of the virtual dashboard 200 through the display 140, wherein the third configuration may display a rear-view image corresponding to the left direction indicator light in a default area corresponding to the left direction indicator light. That is, in this step, because the user is going to drive in the left direction (turn left), the rear-view image of the left direction indicator light of concern is configured in the left half of the entire display area 210 in the original FIG. 3A (that is, the default area corresponding to the left direction indicator light), so that when the user possibly turns the head slightly to the left to observe traffic conditions on the left side because of going to drive in the left direction, the configuration is in line with the action thereof and in line with the direction of vision or of deflecting the head.

Figure 3C:
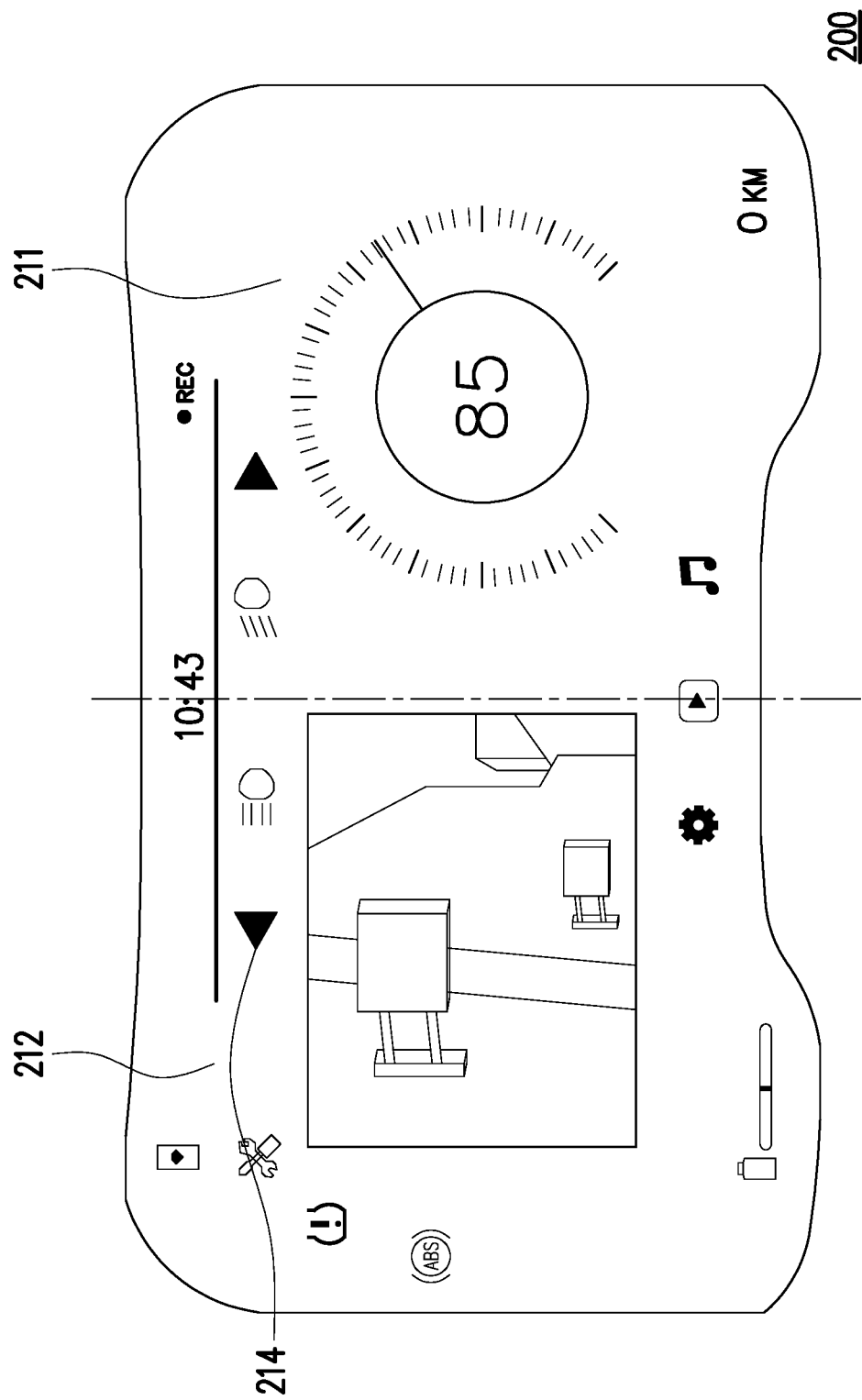
FIG. 3C is a schematic diagram illustrating a third configuration of a virtual dashboard according to an embodiment of the disclosure.

FIG. 3C is a schematic diagram illustrating a third configuration of the virtual dashboard 200 according to an embodiment of the disclosure. Specifically, after the dashboard application program 121 receives a signal associated with a left direction indicator light 214, the dashboard application program 121 may divide the display area of the virtual dashboard 200 from the area 210 into the area 212 corresponding to the left direction and the area 211 corresponding to the right direction. The dashboard application program 121 may set the area 212 corresponding to the left direction as the default area in response to the received signal corresponding to the left direction, so as to display the rear-view image of the left direction through the default area. On the other hand, the dashboard application program 121 may display the dashboard information on the area 211 corresponding to the right direction. In other words, the image originally displayed on the larger area 210 may be reduced and displayed on the smaller area 211. In an embodiment, the dashboard application program 121 may fade the image displayed on the area 211, so that the rear-view image displayed on the area 212 is more prominent to help the user to focus on viewing the rear-view image.

Figure 4:
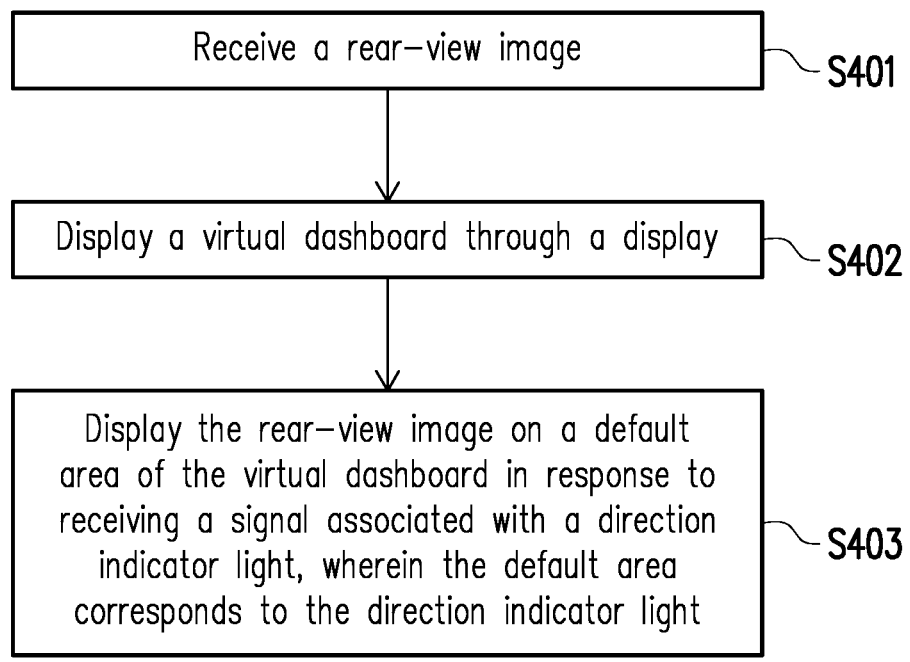
FIG. 4 is a flowchart illustrating a method of displaying a rear-view image according to an embodiment of the disclosure.

FIG. 4 is a flowchart illustrating a method of displaying a rear-view image of a vehicle (e.g., a motorcycle) according to an embodiment of the disclosure, wherein the method may be implemented by the mobile device 100 shown in FIG. 1. In Step S401, a rear-view image is received. In Step S402, a virtual dashboard is displayed through a display. In Step S403, the rear-view image is displayed on a default area of the virtual dashboard in response to receiving a signal associated with a direction indicator light, wherein the default area corresponds to the direction indicator light. In an embodiment, when Step S401 or Step S402 is activated, a function of charging the mobile device 100 is activated at the same time. The function of charging may charge the mobile device 100 through a wired or wireless charging device configured on the motorcycle, so as to ensure that the mobile device 100 has sufficient electric power to continue implementing the method of displaying the rear-view image on the vehicle.

In summary, the mobile device of the disclosure can display the rear-view image of a direction for the user to view when the user intends to turn or switch lanes in the direction, so that the user can timely grasp the situation of vehicles coming from behind. In addition, to cooperate with the turning direction that the user is going to drive, the rear-view image of the turning direction of concern is configured on the area that is inclined to the corresponding turning direction, which is in line with the direction of vision or of an action such as deflecting the head to facilitate driving safety. The mobile device may change a panel surface of the virtual dashboard to display the rear-view image and may enable the displayed rear-view image to be more prominent through manners such as fading the image. By replacing the digital dashboard of the motorcycle with the mobile device, in addition to reducing the production and manufacturing costs of the motorcycle, and saving the cost of maintaining the digital dashboard for the user, an accommodation place with an easy access for the mobile device when driving is also provided for the user to meet the requirements of modern people who are accustomed to carrying mobile devices with them.

What is claimed is:

1. A mobile device, comprising:
    a display;
    a transceiver, receiving a rear-view image;
    a storage medium, storing a plurality of modules; and
    a processor, coupled to the storage medium, the transceiver, and the display, and accessing and executing the plurality of modules, wherein the plurality of modules comprise:
        a dashboard application program displaying a virtual dashboard through the display, wherein the dashboard application program displays the rear-view image on a default area of the virtual dashboard in response to receiving a signal associated with a direction indicator light through the transceiver, wherein the default area corresponds to the direction indicator light.

2. The mobile device of claim 1, wherein the virtual dashboard comprises a first area corresponding to a first direction and a second area corresponding to a second direction, wherein the dashboard application program sets the first area as the default area in response to the direction indicator light corresponding to the first direction.

3. The mobile device of claim 2, wherein the dashboard application program receives dashboard information through the transceiver and displays the dashboard information on the second area.

4. The mobile device of claim 2, wherein the dashboard application program fades an image displayed on the second area.

5. The mobile device of claim 1, wherein the rear-view image comprises a first rear-view image corresponding to a first direction and a second rear-view image corresponding to a second direction, wherein the dashboard application program displays the first rear-view image on the default area in response to the direction indicator light corresponding to the first direction.

6. The mobile device of claim 1, wherein the dashboard application program divides a display area of the virtual dashboard into a first area corresponding to a first direction and a second area corresponding to a second direction in response to receiving the signal.

7. The mobile device of claim 1, wherein the transceiver receives the rear-view image through one of a Wi-Fi protocol, a Bluetooth protocol, and a universal serial bus protocol.

8. The mobile device of claim 1, wherein the dashboard application program is associated with information of operation of a vehicle or driving of the vehicle.

9. A method of displaying a rear-view image, suitable for a mobile device, comprising:
    receiving the rear-view image;
    displaying a virtual dashboard through a display; and
    displaying the rear-view image on a default area of the virtual dashboard in response to receiving a signal associated with a direction indicator light, wherein the default area corresponds to the direction indicator light.

10. The method of claim 9, wherein the virtual dashboard comprises a first area corresponding to a first direction and a second area corresponding to a second direction, wherein the method further comprises:
    setting the first area as the default area in response to the direction indicator light corresponding to the first direction.

11. The method of claim 10, further comprising:
    receiving dashboard information and displaying the dashboard information on the second area.

12. The method of claim 10, further comprising:
    fading an image displayed on the second area.

13. The method of claim 9, wherein the rear-view image comprises a first rear-view image corresponding to a first direction and a second rear-view image corresponding to a second direction, wherein the step of displaying the rear-view image on the default area of the virtual dashboard comprises:
    displaying the first rear-view image on the default area in response to the direction indicator light corresponding to the first direction.

14. The method of claim 9, further comprising:
    dividing a display area of the virtual dashboard into a first area corresponding to a first direction and a second area corresponding to a second direction in response to receiving the signal.

15. The method of claim 9, further comprising: receiving the rear-view image through one of a Wi-Fi protocol, a Bluetooth protocol, and a universal serial bus protocol.

16. The method of claim 9, wherein the virtual dashboard is associated with information of operation of a vehicle or driving of the vehicle.

17. The method of claim 9, further comprising charging the mobile device with a wired charging device or a wireless charging device configured on a vehicle.

* * * * *